Aug. 1, 1967  J. J. DE BAKKER  3,333,563
AMPHIBIAN VEHICLE
Filed Jan. 25, 1966  2 Sheets-Sheet 2
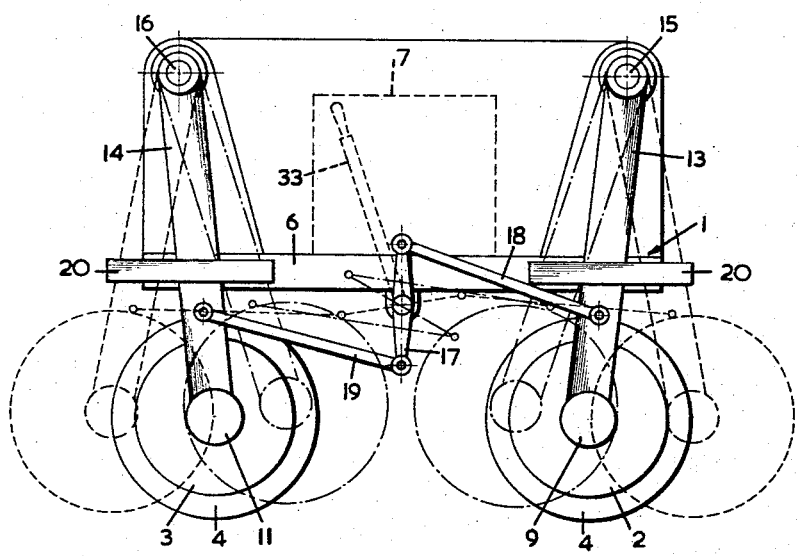
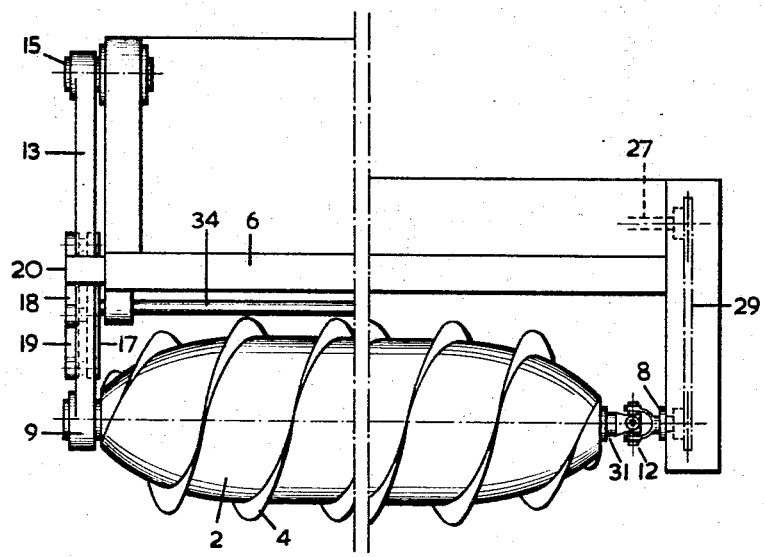
INVENTOR.
Joseph Jean de Bakker
BY
Albert M. Parker
ATTORNEY United States Patent Office 3,333,563
Patented Aug. 1, 1967

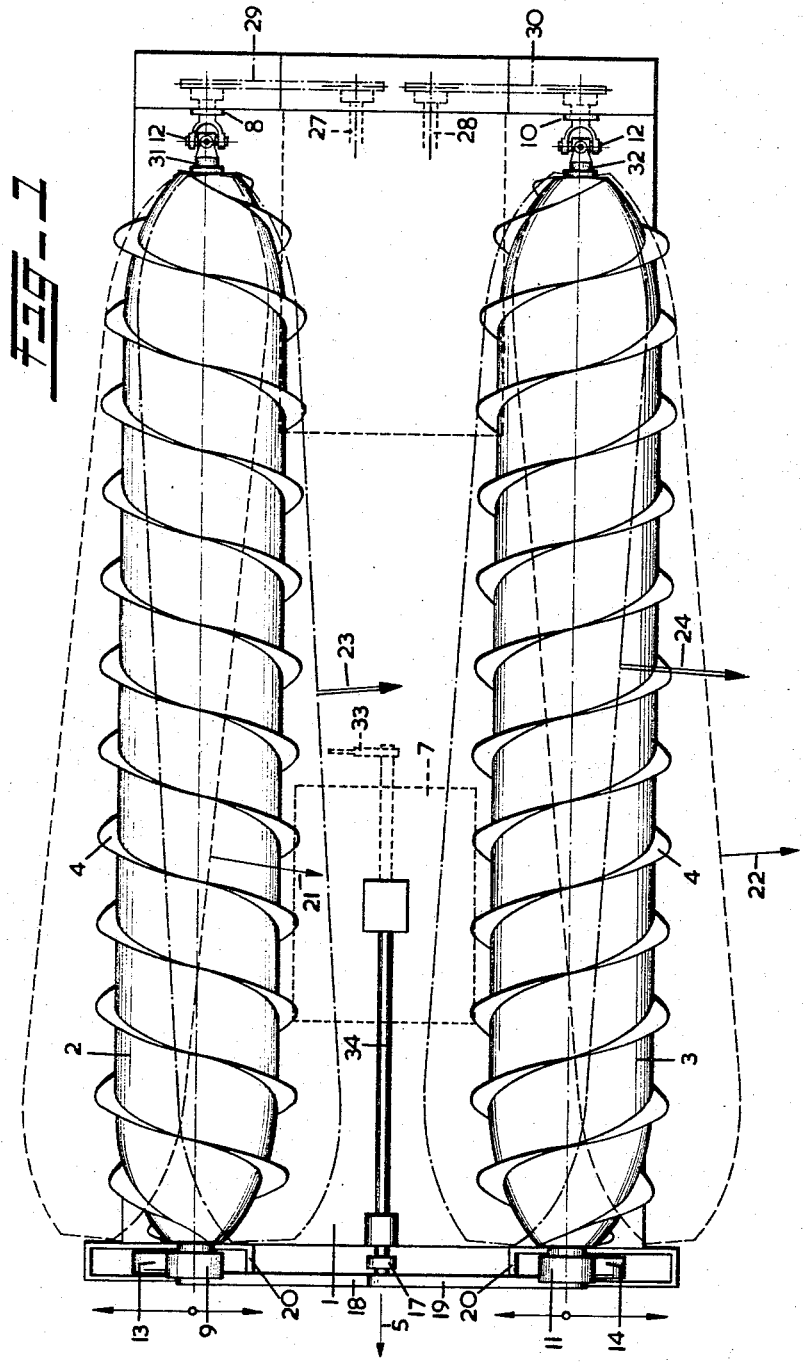

3,333,563
AMPHIBIAN VEHICLE
Joseph Jean De Bakker, Kl. Bagijnestraat 21,
Hulst, Netherlands
Filed Jan. 25, 1966, Ser. No. 522,929
Claims priority, application Netherlands, Jan. 29, 1965,
6,501,187
6 Claims. (Cl. 115—1)

ABSTRACT OF THE DISCLOSURE

An amphibian vehicle adapted for forward or rearward water transit and lateral movement across marshy or muddy land. The vehicle has a frame, at least two horizontally extending torpedo-shaped pontoons having both ends journalled in bearings on the frame, the pontoons having helical ribs of opposite hand on their outer peripheries, and a prime mover on the vehicle. Interposed between the prime mover and the pontoons there is a power transmitting means which selectively drives the two pontoons in the same direction of rotation and in opposite directions of rotation from each other. The vehicle has means for adjusting the angle between the axes of the pontoons, whereby it is controllable when it is driven laterally on land.

An amphibian vehicle adapted for water transit and movement across marshy or muddy land is known from the article "Horizons," published in the American journal "Think," of September 1963, page 30.

The vehicle described in this article is provided with at least two torpedo-shaped pontoons having both ends journalled in bearings so as to be capable of being driven for rotation, and are provided on their outer peripheries with helical ribs which on the two pontoons run in opposite directions. For movement in water or across wet land, the pontoons are driven in opposite directions. Besides marshy and swampy land, this vehicle can also operate on hard surface ground, provided the two pontoons are driven to rotate in the same direction, the vehicle thereby moving laterally as on rollers. However, on lands such as sandy plains, sandy stretches that become uncovered during low tide, and beaches, the oppositely spiralled ribs sink into the ground and hence exert a torque on the vehicle, as a result of which the laterally moving vehicle does not move along a straight line but rather along a circular line. Proper steering of the vehicle thus becomes virtually impossible.

It is an object of the present invention to obviate this disadvantage and to render the vehicle properly controllable even in the above-described circumstances.

To this end there is provided, according to the present invention, an amphibian vehicle comprising a frame and at least two torpedo-shaped pontoons having both ends journalled in bearings so as to be capable of being driven for rotation, and provided on their outer peripheries with helical ribs which on the two pontoons run in opposite directions, at least one of said bearings being horizontally movable relative to said frame.

In a preferred embodiment of the invention the bearings on corresponding ends of the two pontoons are movable in opposite directions.

Furthermore, according to the invention, the drive shafts of the pontoons may be provided with universal joints.

One embodiment of the invention will be described, by way of example, with reference to the accompanying drawings, in which:

FIG. 1 is a bottom view of a vehicle according to the present invention, showing the various positions of the pontoons;

FIG. 2 is a front elevation of the vehicle; and
FIG. 3 is a left side view of the vehicle.

Referring to the drawings, the amphibian vehicle comprises a frame 1 and two, preferably torpedo-shaped, pontoons 2 and 3. Both pontoons are provided with helical ribs 4. The ribs 4 run counterclockwise on pontoon 2 and clockwise on pontoon 3. When moving through water or on marshland, the pontoons are preferably so driven that, as viewed from the back, the right-hand pontoon 3 rotates clockwise and the left-hand pontoon counterclockwise. As a result the water which the pontoons take along upwards is flung away tangentially on both sides of the vehicle. In general the vehicle according to FIG. 1 will move in the direction of the arrow 5.

Mounted on the deck 6 over the pontoons is at least one engine 7 which is connected to the shafts 31 of the pontoons through shafts 27, 28 and transmission means 29, 30 to enable the pontoon shafts to be rotated both in the same direction and in opposite directions. The pontoon shafts 31, 32 are on both ends journalled in bearings 8, 9 and 10, 11, respectively. Adjacent the rear end, the pontoon shafts are provided with universal joints 12.

The bearings 9 and 11, in which the front ends of the pontoon shafts are journalled, are mounted in the lower ends of arms 13 and 14, respectively. The upper ends of the arms 13 and 14 are pivoted by means of axles 15 and 16, respectively, mounted on the frame 1. Accordingly, the front ends of the pontoon shafts are movable relative to the frame of the vehicle in a substantially horizontal, arcuate track. The position of the bearings 9 and 11, and hence of the pontoons 2 and 3, relative to each other can be controlled by means of a yoke 17 rotatable about a shaft between the arms 13 and 14, the yoke being connected with the arms 13 and 14 by means of rods 18 and 19, respectively. As will be readily seen from the drawing, when the yoke is turned, the arms 13 and 14 are pivoted simultaneously either inwardly or outwardly. The position of the yoke can be easily controlled by means of a steering wheel or stick 33 and a steering column 34.

The movement of the suspension arms is on both sides defined by stops 20.

The operation of the steering gear will be described with particular reference to FIG. 1.

In the diverging position of the pontoons, shown in dash lines, pontoon 2, in rolling laterally across relatively hard surface ground, such as wet sand, tends to move in the direction of the arrow 21, but pontoon 3 tends to move in the direction of the arrow 22. This creates a torque moving the vehicle in a circular track with the center located to the right of the vehicle (as seen in the drawings) adjacent the point of intersection of the pontoon shafts.

When the bearings 9 and 11 are displaced inwardly the pontoons will assume the converging position shown in dash-dot lines. When the vehicle is now driven for lateral movement, pontoon 2 will tend to move in the direction of the double arrow 23, and pontoon 3 in the direction of arrow 24. As a consequence of the resulting torque the vehicle is moved along a circular track with the center located to the left of the vehicle (as seen in the drawings) adjacent the point of intersection of the pontoon shafts.

It will be evident that a control is possible between a maximum turn to the left and a maximum turn to the right. Due to the torque exerted by the helical ribs, which increases the effect of the converging pontoons, the maximum angle of deviation of the pontoon shafts inwardly of the parallel position may be kept smaller than the maximum angle of deviation of the pontoon shafts outwardly of the parallel position, in other words, the maximum angle of convergence of the pontoons will preferably be smaller than the maximum angle of divergence.

By virtue of the improved construction provided by the present invention the operation of the amphibian vehicle is no longer limited to water or marshland, but the vehicle can equally successfully pass from wet to dry ground, which renders it particularly suitable as a means of conveyance for human beings and materials in undulated, water-rich areas, such as:

(a) Areas which periodically become dry with a hard and/or soft ground and puddles;
(b) Polderings which become dry;
(c) Siltlands with furrows and creeks, fens and lakes, which may or may not be overgrown;
(d) Marshes and snow covered areas.

In addition to being a means of conveyance, the amphibian vehicle is excellently suitable as a movable workshop or dwelling.

I claim:

1. An amphibian vehicle comprising a frame, at least two horizontally extending torpedo-shaped pontoons having both ends journalled in bearings on the frame, the pontoons having helical ribs of opposite hand on their outer peripheries, a prime mover on the vehicle, power transmitting means interposed between the prime mover and the pontoons for selectively driving the two pontoons in the same direction of rotation and for driving the two pontoons in opposite directions of rotation from each other, and means for adjusting the angle between the axes of the two pontoons.

2. An amphibian vehicle as in claim 1, comprising a universal joint connecting the end of the said pontoon opposite said end thereof carried by the horizontally adjustable bearing to the power transmitting means.

3. An amphibian vehicle as in claim 1, wherein at least one pair of bearings on the corresponding ends of the two pontoons are provided with means for adjusting them in an at least generally horizontal direction.

4. An amphibian vehicle as in claim 3, comprising means connecting said horizontally adjustable bearings for simultaneous adjustment in opposite directions.

5. An amphibian vehicle as in claim 3, comprising means connecting said horizontally adjustable bearings for simultaneous adjustment in equal amounts in opposite directions.

6. An amphibian vehicle as in claim 3, comprising universal joints connecting the same, first ends of the pontoons to the power transmitting means, and wherein the pair of horizontally adjustable bearings are disposed at the second, opposite end of the pontoons.

References Cited

UNITED STATES PATENTS

| 669,210 | 3/1901 | Burch | 115—1 X |
| 1,997,578 | 4/1935 | Eslick | 115—19 |
| 2,388,711 | 11/1945 | Sawyer | 115—19 |
| 3,229,658 | 1/1966 | Schrader | 115—1 |

MILTON BUCHLER, *Primary Examiner.*

ANDREW H. FARRELL, *Examiner.*